(12) United States Patent  
Palmer et al.

(10) Patent No.: US 12,311,792 B2
(45) Date of Patent: May 27, 2025

(54) MOUNTING SYSTEM FOR AN ELECTRIC VEHICLE CHARGING APPARATUS

(71) Applicants: Jeff Palmer, Santa Barbara, CA (US); Chris Pettigrew, Santa Rosa, CA (US); Erik Andreas Karlsson, San Diego, CA (US)

(72) Inventors: Jeff Palmer, Santa Barbara, CA (US); Chris Pettigrew, Santa Rosa, CA (US); Erik Andreas Karlsson, San Diego, CA (US)

(73) Assignees: BP PULSE FLEET NORTH AMERICA INC., Mountain View, CA (US); TEICHERT INC., Sacramento, CA (US)

( * ) Notice: Subject to any disclaimer, the term of this patent is extended or adjusted under 35 U.S.C. 154(b) by 700 days.

(21) Appl. No.: 17/694,272

(22) Filed: Mar. 14, 2022

(65) Prior Publication Data

US 2022/0289054 A1 Sep. 15, 2022

Related U.S. Application Data

(60) Provisional application No. 63/160,516, filed on Mar. 12, 2021.

(51) Int. Cl.
*B60L 53/16* (2019.01)
*B60L 53/31* (2019.01)
*B60L 53/51* (2019.01)

(52) U.S. Cl.
CPC ............... *B60L 53/31* (2019.02); *B60L 53/16* (2019.02); *B60L 53/51* (2019.02)

(58) Field of Classification Search
CPC .......... B60L 53/31; B60L 53/16; B60L 53/51; B60L 2200/18; B60L 53/30
See application file for complete search history.

(56) References Cited

U.S. PATENT DOCUMENTS

| 4,158,802 A * | 6/1979 | Rose, II | H02J 7/02 320/109 |
| 2023/0249561 A1 * | 8/2023 | Schlüter | B60L 53/18 320/109 |

OTHER PUBLICATIONS

"Proterra Presentation Template (caltransit.org)", retrieved from https://caltransit.org/cta/assets/Fall%20Conference/2017/PPTs/Maintenance/MAINT-Zero%20Emission%20Implementations-Poppel(1).pdf on Nov. 14, 2022, 2017.

(Continued)

*Primary Examiner* — Amy J. Sterling
(74) *Attorney, Agent, or Firm* — Dorsey & Whitney LLP

(57) ABSTRACT

An electric vehicle charger charging apparatus is configured to suspend from a canopy and connect to an electric vehicle from above the vehicle. The canopy has a purlin frame and supports a photovoltaic module for generating electricity. The electric vehicle charging apparatus suspends from the purlin frame of the canopy by a mounting structure. The mounting structure includes a first vertical brace and a second vertical brace having bottom connection points connectable to mounting points on a vehicle charger and top connection points connectable to a block brace coupled to the purlin frame. The mounting points on the vehicle charger are level to horizontal ground surface and the canopy is sloped with respect to the horizontal ground surface such that the second vertical brace has a greater length between the top and bottom connection points than the first vertical brace.

20 Claims, 7 Drawing Sheets

(56) References Cited

OTHER PUBLICATIONS

"Solar Photovoltaic Canopies Brochure (circutor.com)", retrieved from https://docs.circutor.com/docs/CT_PVing_Parks_EN.pdf on Nov. 14, 2022.

Field, Kyle, "Proterra Gives Fleet Operators More Reasons to Go Electric", retrieved from https://cleantechnica.com/2018/05/09/proterra-gives-fleet-operators-more-reasons-to-go-electric-with-new-line-of-charging-stations/ on Nov. 14, 2022, May 9, 2018.

\* cited by examiner

MOUNTING SYSTEM FOR AN ELECTRIC VEHICLE CHARGING APPARATUS

CROSS REFERENCE TO RELATED APPLICATION

This claims the benefit of U.S. Provisional Application No. 63/160,516, filed on 12 Mar. 2021, which is hereby incorporated by reference in its entirety.

BACKGROUND

Electric vehicle use and adoption are limited by current infrastructure for transferring power to the electric vehicles. Some electric vehicles, such as electric trains and light rail cars, are permanently connected to a power source through hardware in the railing or through overhead lines. Other electric vehicles, such as electric cars or buses, are charged by plugging in the electric vehicle at a charging station.

When recharging an electric vehicle, a charging cord is typically connected to the vehicle, which may be positioned about 2-4 feet off the floor. A standard length charging cord (about 20 ft.) may hinder access to the vehicle or opening of vehicle doors, become a trip hazard, or be driven over multiple times and thereby become damaged.

Designers and engineers are constantly seeking improvements to systems and methods for charging electric vehicles.

SUMMARY

Embodiments disclosed herein include a mounting system for an electric vehicle charging apparatus. In an embodiment, the mounting system may include a first vertical brace having a bottom connection point connectable to a first mounting point on a vehicle charger and a top connection point connectable to a sloped support structure. The first vertical brace may have a first length between the bottom and top connection points. The mounting system may also include a second vertical brace having a bottom connection point connectable to a second mounting point on the vehicle charger and a top connection point connectable to the sloped support structure. The second vertical brace may have a second length between the top and bottom connection points. The first length may be less than the second length.

In some embodiments, the sloped support structure may comprise a first block brace and the mounting system may include a second block brace. The first and second vertical braces may couple to the first block brace and the mounting system may include a third vertical brace and a fourth vertical brace. The third and fourth vertical braces may be coupled to the second block brace. The third vertical brace may include a bottom connection point connectable to a third mounting point on the vehicle charger and a top connection point connectable to the second block brace. The third vertical brace may have a length between the bottom and the top connection points equal to the first vertical brace. The fourth vertical brace may include a bottom connection point connectable to a fourth mounting point on the vehicle charger and a top connection point connectable to the second block brace. The fourth vertical brace may have a length between the bottom and the top connection points equal to the second vertical brace.

In some embodiments, the sloped support structure includes a block brace configured to couple to a purlin frame to fortify the purlin frame and limit rotation of the vehicle charger relative to the purlin frame. The mounting system may further include at least one diagonal support brace. The support brace may couple a connector coupled to either the first or second mounting point on the vehicle charger to an additional connection point on the sloped support structure. In some embodiments, the first vertical brace may include a connector configured to couple the first mounting point on the vehicle charger directly to the sloped support structure. The top connection point of the first vertical brace and the top connection point of the second vertical brace may attach to the sloped support structure along a line having an about 5% to about 15% grade relative to a horizontal ground surface. The first vertical brace and/or the second vertical brace may include a threaded rod.

In some embodiments, the sloped support structure may include a beam having a generally C-shaped cross-sectional profile and a bracket on each end of the beam. The sloped support structure may include a block brace with a first surface, a second surface, and at least one opening extending through the first and second surfaces. The vertical brace may extend through the opening and may be secured with a top fastener on the first surface and a bottom fastener on the second surface. In some embodiments, the first and second mounting points on the vehicle charger may include a first surface, a second surface, and at least one opening extending through the first and second surfaces. The first vertical brace or the second vertical brace may extend through the opening and may be secured with a top fastener on the first surface and a bottom fastener on the second surface.

In some embodiments, a system for charging an electric vehicle is disclosed. The system may include a canopy having a purlin frame and supporting a photovoltaic module for generating electricity above an electric vehicle. The system may further include a mounting structure coupled to the purlin frame. The mounting structure may include a first vertical brace and a second vertical brace. The system may also include at least one electric vehicle charging apparatus including a mounting bracket coupled to the mounting structure. The electric vehicle charging apparatus may be configured to connect to an electric vehicle from above the electric vehicle. The first vertical brace may have a first length coupling the purlin frame to the mounting bracket and the second vertical brace may have a second length coupling the purlin frame to the mounting bracket. The first length may be less than the second length.

In some embodiments, the canopy may include a support structure having a vertical support column coupled to a laterally-extending support beam and a bottom portion coupled to a ground foundation. The canopy may have a generally T-shaped side profile. In some embodiments, a first end of the first vertical brace and a first end of the second vertical brace may attach to a block brace along a line having an about 5% to about 15% grade relative to a horizontal ground surface. The block brace may be coupled to the purlin frame. In some embodiments, the at least one electric vehicle charging apparatus may extend upward from the mounting bracket without contacting the canopy. The at least one electric vehicle charging apparatus may include an arm movable between a lowered position to engage an electric vehicle and a raised position disengaged from the electric vehicle. The at least one electric vehicle charging apparatus may also include a charging connector coupled to the arm. The at least one electric vehicle charging apparatus may be mounted to the canopy with the charging connector oriented generally parallel to a horizontal ground surface.

Also disclosed is an electric vehicle charger mounting structure including a purlin brace system configured to attach to a canopy structure. The electric vehicle charger mounting structure may further include a first vertical brace connectable to a first attachment point on the purlin brace system and to a first mounting point on a vehicle charger. The mounting structure may also include a second vertical brace connectable to a second attachment point on the purlin brace system and to a second mounting point on the vehicle charger. The first and second vertical braces may be configured to suspend the first and second mounting points from the purlin brace system in a horizontal plane and where the first and second attachment points are in a non-horizontal plane. The purlin brace system may include at least one purlin brace.

In some embodiments, the electric vehicle charger mounting structure may further include at least one support bar extending diagonally between a connector coupled to either the first or second mounting point and a third attachment point on the purlin brace. The purlin brace system may be configured to fortify the canopy structure and limit rotation of the vehicle charger relative to the canopy structure.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Embodiments disclosed herein are related to a system for charging an electric vehicle. The system for charging an electric vehicle may include a mounting system for an electric vehicle charging apparatus and/or an electric vehicle charger mounting structure.

In the exemplary systems described herein, different forms of words such as "coupling," "attaching," "mounting," and/or connecting" are used to describe relationships between various components and the steps taken during various processes. The use of these different words is not intended to be limiting. For example, when two components are "coupled," they may be removably coupled or permanently coupled. Similarly, two "attached" or "connected" components may be temporarily or permanently attached. "Mounting" and "connecting" are used herein to describe the general positioning of various components for use and are similarly not intended to be limiting. The terms "end" and "point" and "top" and "bottom" are used herein to reference various configurations, locations, and/or opposite sides of a structure, but it is understood that elements may be described as "first" or "top" may be "second" or "bottom," and vice versa.

Figure 1:
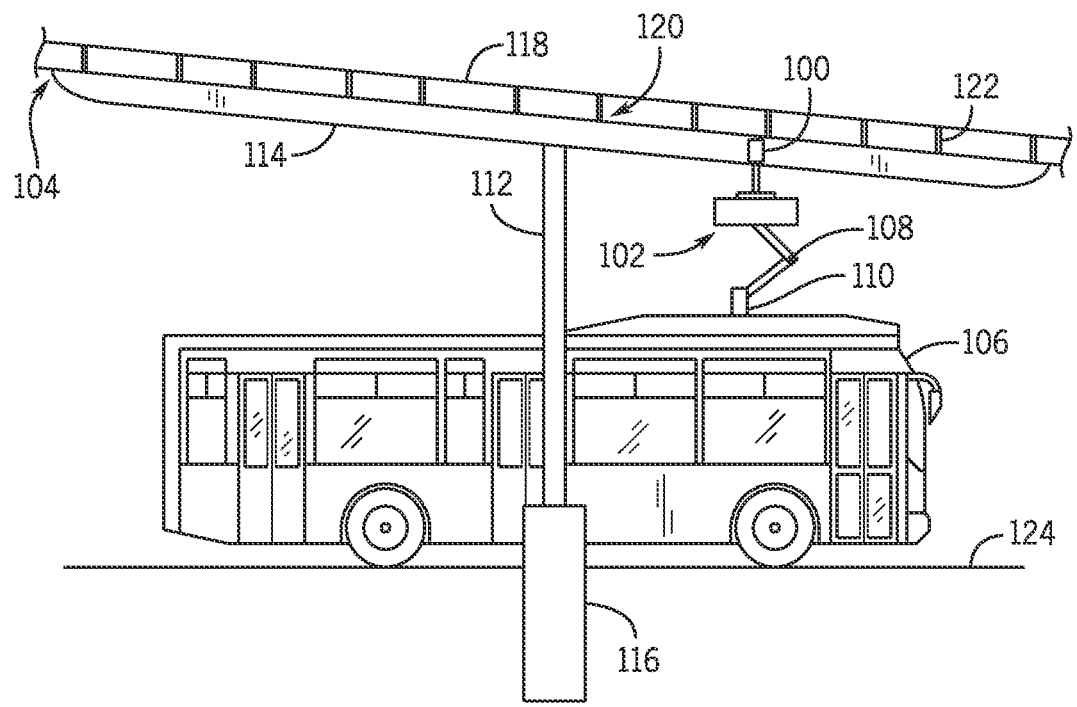
FIG. 1 is a side view of a system for charging an electric vehicle, according to an embodiment of the present disclosure.

FIG. 1 illustrates an embodiment of a mounting system 100. The mounting system 100 may couple an electric vehicle charging apparatus 102 to a canopy 104. In some embodiments, an electric vehicle 106 may be charged when coupled to the charging apparatus 102. Electric vehicle 106 may include a bus (as shown in FIG. 1), a car, a van, a trolley, a tractor, or any other suitable electric vehicle. In some embodiments, the charging apparatus 102 may include an arm 108 movable or articulable between a lowered position to engage the electric vehicle 106 (as shown in FIG. 1) and a raised position disengaged from the electric vehicle 106 (e.g., as shown by charging apparatuses 102 in FIGS. 3A and 4). The charging apparatus 102 may include a charging connector 110 coupled to the arm 108. The charging connector 110 may couple to the vehicle 106 to transfer power from the charging apparatus 102 to the vehicle 106. The charging apparatus 102 may be used to transfer power to any electric vehicle, hybrid electric vehicle, or any other vehicle that may include an energy storage system for power, such as a battery, ultra-capacitor, or any other energy storage system. In some embodiments, the charging apparatus 102 can provide power to a battery or other energy storage system that is connected to a vehicle engaging the charging connector 110.

In some embodiments, the vehicle 106 may receive power from the charging apparatus 102 through electrical contacts or any other suitable receiver, plug, or connector. The receiver may be positioned on a top surface of the vehicle 106. In these examples, the top surface may be at least partially positioned on a roof, a hood, a roll bar, an overhang, a shade, a canopy, or any other suitable vehicle portion such that the charging apparatus 102 may transfer power to the vehicle 106. Generally, transferring power to the vehicle 106 includes positioning the vehicle 106 under the charging apparatus 102 and lowering the arm 108 to a position such that the charging connector 110 couples to the vehicle 106. This allows the charging connector 110 to remain out of the way of the vehicle 106 when it disembarks and when a new vehicle approaches. This configuration can also help keep the charging connector 110 out of reach of nearby pedestrians or others who could tamper or interfere with the operation of the charging apparatus 102.

The charging apparatus 102 may have a sensor and/or the arm 108 may include a mechanical or electro-mechanical height adjustment system to allow the arm 108 to adjust to a height required to allow the vehicle 106 to drive under the charging connector 110. In some embodiments, height adjustment may include the charging connector 110, the arm 108, and/or any other component of the charging apparatus 102. The charging connection may be configurable to any height required to establish an electrical connection with the vehicle 106. The electrical connection may be established for a sufficient time to charge the vehicle completely or partially. The charging apparatus 102 may only activate when an electrical connection is made between the vehicle 106 and the charging connector 110 and/or a signal is received from the vehicle 106 to commence charging. The arm 108 can therefore be configured to extend and retract by bending at a hinge, by moving telescoping parts relative to each other, or by similar mechanisms.

The canopy 104 or overhead structure may be configured to extend above a height of the vehicle and may optionally include sheltering features, such as a roof or the like, that shield the vehicle and the charger 134 from weather elements. In an embodiment, the canopy 104 may include a support structure having a vertical support column 112 coupled to a substantially straight support beam 114 and a bottom portion coupled to a ground foundation 116. As such, the canopy 104 may be generally T-shaped when viewed on end (i.e., may have a generally T-shaped side profile with a tilted/sloped top portion, as shown in FIG. 1). As discussed in more detail below, the support beam 114 may be angled relative to the support column 112, such that the top surface of the canopy 104 may be tilted or angled relative to a horizontal ground surface. The vertical support column 112 shown in FIG. 1 is a single pole, which may be either tubular or solid. In other embodiments, the vertical support column 112 may be comprised of multiple elements and is not limited to the illustrated configuration of FIG. 1.

In other embodiments, the canopy 104 may include more than one vertical support columns 112 and more than one support beams 114. In some embodiments, several vehicles 106 may be parked under the canopy 104 and/or several charging apparatuses 102 may be mounted thereon. The ground foundation 116 may be configured to be embedded into the ground for providing a stable mounting point. Other types of ground anchors may be used, including others that have configurations suited for specific ground conditions. The support beam 114 may be secured to the vertical support column 112 by any suitable fasteners and attachment systems such as clamps, straps, bolts, welding, rivets, etc.

The canopy 104 may further include a structural frame such as a purlin frame 120. Generally, a purlin may be defined as a longitudinal, horizontal, structural member that supports the canopy 104 or covering or roof structure. The purlin frame 120 may include several purlins 122 extending from the support beam 114 or coupling multiple support beams 114. In some embodiments, the components of the canopy 104 may be formed of any suitable load bearing material, such as iron, steel, aluminum, fiberglass, composite materials, carbon fiber, related materials, and combinations thereof. The illustrated embodiment provides one configuration, and other constructions, configurations and materials may be used.

In some embodiments, the canopy 104 may include a photovoltaic module 118 coupled to the purlin frame 120 and/or to support beams 114. The photovoltaic module 118 may be configured to receive solar radiation and convert the solar radiation to electricity. The manner in which the photovoltaics function to convert solar radiation to electricity is known and not detailed herein. By including photovoltaic module 118, the canopy 104 may both generate electricity, taking advantage of otherwise inactive surface area that may have a continual, daily exposure to the sun, and support the charging apparatus 102 for transferring power to electrical vehicle 106. In some embodiments, the canopy 104 may be constructed such that a surface of the photovoltaic module 118 may be tilted at a grade in reference to a horizontal ground surface 124. The grade may be from about 5% to about 15% relative to the ground surface 124, the grade may be selected based on a desired orientation for solar radiation capture and may be varied based on geographic location, incident sunlight, photovoltaic properties, and the like. In some instances, beam 114 may be angled to slope between first and second ends, such that as the photovoltaic modules 118 are coupled thereto, they may be sloped in a corresponding manner. In some embodiments, the grade of the canopy may beneficially improve the solar capture efficiency of the photovoltaic module 118 and may provide drainage and/or other fundamental benefits.

Figure 2:
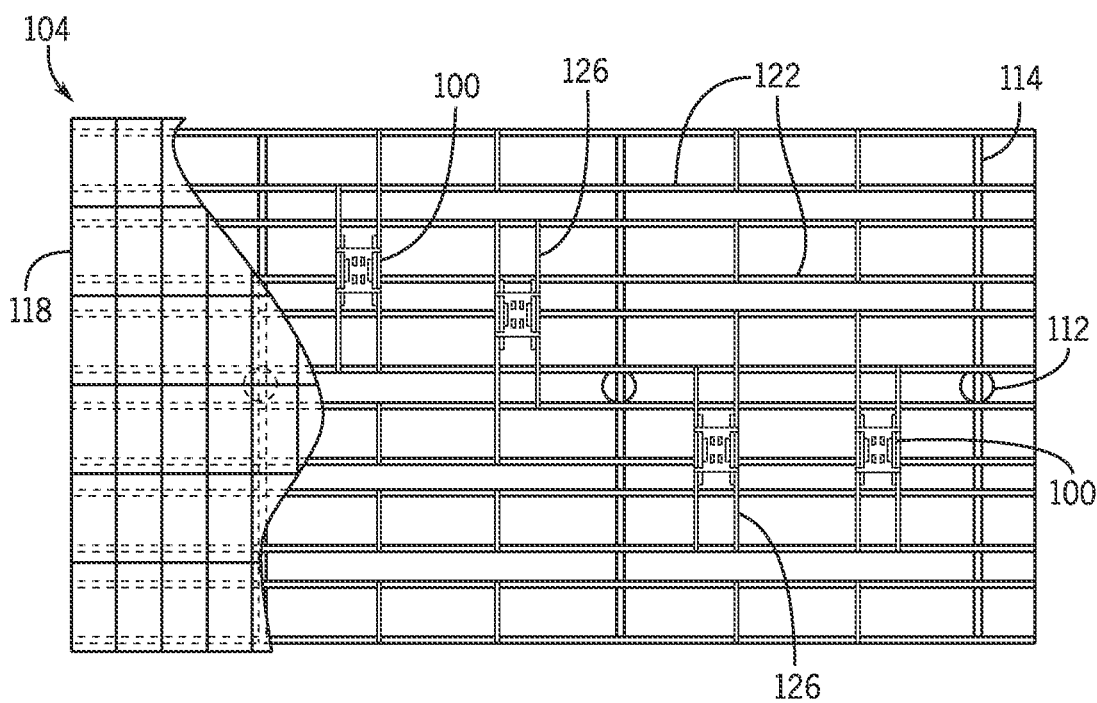
FIG. 2 is a partial cutaway top view of a canopy including a mounting system for an electrical vehicle charging apparatus.

As discussed above, the canopy 104 may include an area sufficient to include several charging apparatuses 102 and may be configured to have capacity to charge several vehicles 106 simultaneously. Thus, the canopy 104 can be configured to support charging apparatuses 102 for charging one vehicle, multiple side-by-side vehicles, and multiple end-to-end vehicles. The canopy 104 can cover and shelter all of the vehicles or at least a portion of one or more vehicles. In an embodiment, the photovoltaic module 118 is supported by the purlins 122. Referring now to FIG. 2, in some embodiments, at least two of the purlins 122 may be coupled to each other by a block brace 126. The block brace 126 may be configured to couple to the purlin frame 120 to fortify the purlin frame 120 by reinforcement of the purlins 122. In some embodiments, as the electric vehicle charging apparatus 102 engages the vehicle 106, a stress may be applied to the purlin frame 120 as the arm 108 pushes down on the vehicle 106 (i.e., due to the charging apparatus 102 pushing back up against the block braces). The block brace 126 may minimize and/or prevent bending of the purlins 122 when the electric vehicle charging apparatus 102 is coupled to the vehicle 106. Accordingly, by minimizing bending of the purlins 122, the block brace 126 may also limit rotation of the charging apparatus 102 relative to the purlin frame 120 (e.g., limiting rotation about an axis that extends along the bottom surface lengths of the block braces 126), thereby ensuring that the charging apparatus 102 remains aligned with the charging connector on a vehicle. Otherwise, the reaction forces applied to the block braces 126 and purlins 122 could cause rotation of the charging apparatus 102 about the axis along the bottom of the bottom surface lengths of the block braces 126 and could cause misalignment or an intermittent connection between the vehicle and the charging connector, charging arm, or both. Accordingly, embodiments of the present disclosure can help maintain a more consistent charging connection between the charging apparatus 102 and a vehicle being charged by reducing or preventing upward bending or rotation of the purlins 122 near the charging apparatus 102.

In some embodiments, the block brace 126 may span between two purlins 122. In other embodiments, the block brace 126 may span several purlins 122 as required to support the charging apparatus 102, the photovoltaic module 118, or components and/or design considerations. In some embodiments, multiple block braces 126 are used, such as to join a first purlin 122 to a second purlin 122 and to join the second purlin to a third purlin 122. In some embodiments, the mounting system 100 may include the block brace 126. In other embodiments, the mounting system 100 may be configured to couple directly to the purlin frame 120.

Figure 3A:
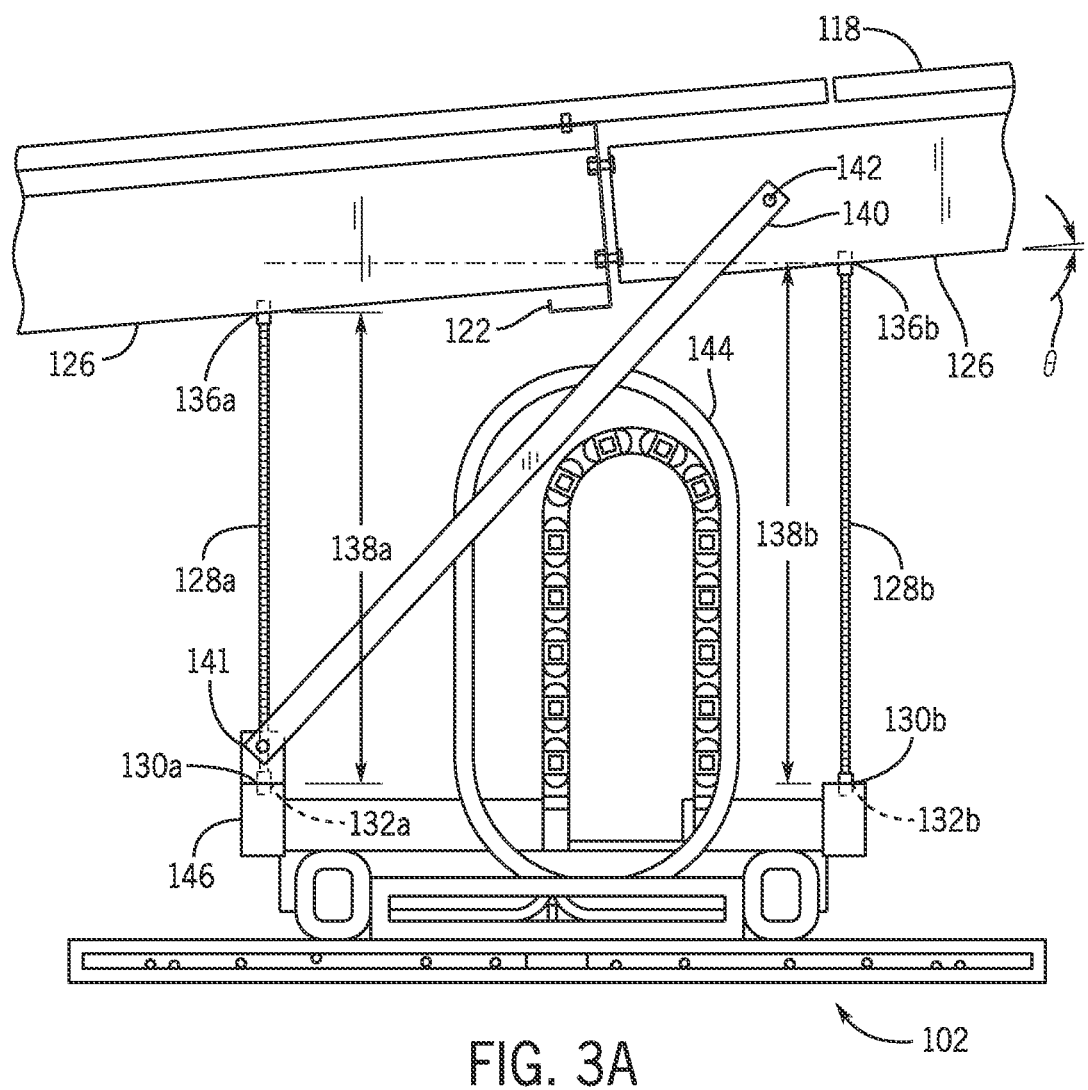
FIG. 3A is a schematic side view of a mounting system for an electrical vehicle charging apparatus.

The mounting system 100 of FIG. 1 is shown schematically extending between a support beam 114 and the charging apparatus 102. FIG. 3A shows an embodiment wherein the mounting system 100 or mounting structure for an electric vehicle charging apparatus 102 may include a first vertical brace 128a having a bottom connection point 130a connectable to a first mounting point 132a on a vehicle charger 134 and a top connection point 136a connectable to the block brace 126. In some embodiments, the first vertical brace 128a may have a first length 138a between the bottom connection point 130a and the top connection point 136a. The first vertical brace 128a may include any suitable brace material that supports at least a portion of the vehicle charger 134. In some embodiments, the first vertical brace 128a may include a threaded rod. The threaded rod may be constructed of steel or any other alloy, metal, plastic, composite, or other suitable material. The threaded rod may include any suitable diameter to support the vehicle charger 134, such as ⅜ inch, ½ inch, ¾ inch, or 1 inch. In other embodiments, the first vertical brace 128a may include an angle beam (e.g., with an L-shaped cross section). The angle beam may also be constructed of steel or any other alloy, metal, plastic, composite, or other suitable material and may also include any suitable thickness to support the vehicle charger 134.

The mounting system 100 may further include a second vertical brace 128b having a bottom connection point 130b connectable to a second mounting point 132b on the vehicle charger 134 and a top connection point 136b connectable to the block brace 126. In some embodiments, the second vertical brace 128b may have a second length 138b between the bottom connection point 130b and the top connection point 136b. In some embodiments, the second vertical brace 128b may be the same type of brace as the first vertical brace 128a (e.g., a threaded rod). The braces 128a, 128b may extend generally parallel to one another. In some embodiments, the first length 138a may be less than the second length 138b. In some embodiments, the top connection point 136a of the first vertical brace 128a and the top connection point 136b of the second vertical brace 128b may attach to the block brace 126 along a line having an about 5% to about 15% grade relative to the horizontal ground surface 124, which grade may correspond to an angle used to optimize solar charging efficiency of the canopy 104. FIG. 3A shows an angle θ between a horizontal plane and the slope of the block brace 126. In an embodiment, θ may be from about 2.5° to about 8.5°, which is approximately about 5% to about 15% grade relative to the horizontal ground surface 124. In some embodiments, the angle θ can be defined as being between a horizontal plane and the slope of a plane in which the top connection points 136a, 136b are coplanar. In FIG. 3A, this plane extends along the bottom surface of the block braces 126. In some configurations, this plane may be positioned higher than the bottom surface of the block braces 126 (e.g., if the connection points 136a, 136b were attached to side walls of one or more block braces 126, to side walls of the support beam 114, to one of the purlins 122, and/or combinations thereof).

Thus, the canopy 104 and other support structures (beam 114, purlins 122, etc.) can have portions oriented at a non-orthogonal angle relative to a horizontal plane and can support PV generation equipment, a charging apparatus can be mounted to an overhead structure including the angled portions using a mounting structure. The mounting structure can extend between the overhead structure and the charging apparatus with attachment points to the angled portions and to the charging apparatus that mitigate the non-orthogonal angle and enable the charging apparatus to be supported hanging level and horizontal relative to the ground while also being attached to the angled portions of the canopy or other support structures.

The first vertical brace 128a and the second vertical brace 128b may be configured to suspend the first mounting point 132a and the second mounting point 132b from the block brace 126 in a horizontal plane while the top connection point 136a of the first vertical brace 128a and the top connection point 136b of the second vertical brace 128b are in a non-horizontal plane. In other words, the top connection point 136b of the second vertical brace 128b is coupled to the block brace 126 at a higher point relative to the horizontal ground surface 124 than the top connection point 136a of the first vertical brace 128a. Thus, the second vertical brace 128b may extend vertically to a higher point than vertical brace 128a when the bottom connection point 130a of the first vertical brace 128a and the bottom connection point 130b of the second vertical brace 128b attach to the vehicle charger 134 at the same height relative to the horizontal ground surface 124. In other words, the length of the first vertical brace 128a between the bottom connection point 130a and the top connection point 136a may be less than the length of the second vertical brace 128b between the bottom connection point 130b and the top connection point 136b. In an embodiment, the block brace 126 may couple to the purlin frame 120 of the canopy 104. The vertical braces 128a, 128b may thus have varying lengths that allow the charging apparatus 102 to have a horizontal bottom surface needed to ensure proper movement of a charging connector 110 and proper engagement with a vehicle. The varying lengths can also allow the charging apparatus 102 to be precisely mounted on the canopy 104, even if the support structures 114 are sloped or tilted where the charging apparatus 102 is needed. This may help ensure that the charging apparatus 102 is able to connect to a vehicle directly over where the vehicle parks below the canopy 104 without having to add new support beams that would be needed to keep top ends of the vertical braces 128a, 128b in a horizontal plane parallel to the bottom ends of the braces.

In some embodiments, the mounting system 100 may include at least one diagonal support bar or brace 140. The support bar or brace 140 may be configured to couple to a connector 141 coupled to one of the mounting brackets 146 (e.g., at either the first mounting point 132a or the second mounting point 132b) on the vehicle charger 134 and to an additional connection point 142 on one of the block braces 126 positioned above the charging apparatus 102 (e.g., one of the block braces 126 on each side of a purlin 122, to a single block brace 126 extending between two purlins 122, or to a support beam 114). The connector 141 may couple to either the first connection point 130a or the second connection point 130b on the vehicle charger 134. In some embodiments, the connector 141 may be integrated into the mounting bracket 146. In other embodiments, the connector 141 may be coupled to the mounting bracket 146 by any suitable fasteners and attachment systems such as clamps, straps, bolts, welding, rivets, etc. In some embodiments, the support brace may 140 may stiffen the mounting system 100 and limit rotation of the vehicle charger 134 about a vertical axis relative to the purlin frame 120 and/or the block brace 126 (e.g., due to torques applied by wind, by movement of the canopy, or by contact between the charging apparatus 102 and a vehicle).

The support brace 140 may additionally provide support for the weight of the vehicle charger 134 suspended from the block brace 126. For example, the support brace 140 may be a metal bar having a lower end coupled to the mounting bracket 146 of the vehicle charger 134. The support brace 140 may couple to the first mounting point 132a with any suitable fastener including a bolt and nut, a threaded rod, a weld, rivets, similar mechanisms, and combinations thereof. The support brace 140 may couple to the block brace 126 with a similar type of fastening or attachment system. In some embodiments, the support brace 140 may couple to the purlin 122 or to support beam 114.

In some embodiments, electric vehicle charging apparatus 102 may extend upward from the first mounting point 132a and the second mounting point 132b of the mounting bracket 146 without contacting the purlins 122 or block braces 126, as shown in FIG. 3A. Components of the electric vehicle charging apparatus 102 may be located above the first mounting point 132a and the second mounting point 132b such that the first vertical brace 128a and the second vertical brace 128b may be configured to suspend the first mounting point 132a and the second mounting point 132b below the block brace 126 at a length sufficient that the electric vehicle charging apparatus 102 may extend upward without damaging any components of the electric vehicle charging apparatus 102 and/or the photovoltaic module 118. In some embodiments, the electric vehicle charging apparatus 102 may include a housing 144 to protect its internal components. Thus, the housing 144 may extend upward from the first mounting point 132a and the second mounting point 132b without contacting the canopy 104 or purlins 122.

In some embodiments, at least one electric vehicle charging apparatus 102 may include a mounting bracket 146 coupled to the mounting structure or mounting system 100. The charging apparatus 102 of FIG. 3A has mounting brackets 146 arranged at corners of rectangular frame surrounding the housing 144. The electric vehicle charging apparatus 102 may be configured to connect to the vehicle 106 from above the vehicle 106. In some embodiments, the mounting structure may include the first vertical brace 128a and the second vertical brace 128b. The first vertical brace 128a may have first length 138a between the purlin frame 120 and the mounting bracket 146 and the second vertical brace 128b may have a second length 138b between the purlin frame 120 and the mounting bracket 146. The first length 138a may be less than the second length 138b.

Figure 3B:
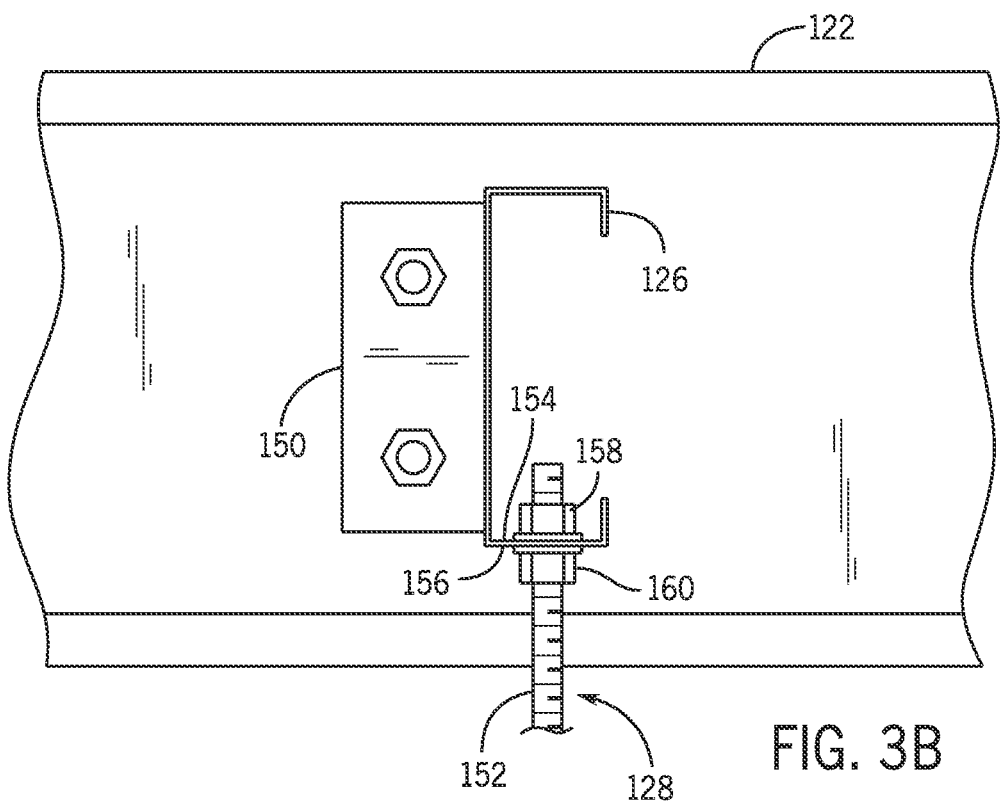
FIG. 3B is a schematic view of a vertical brace coupled to a block brace.

As shown in FIGS. 2-3B, in some embodiments, a block brace 126 may be coupled to the purlin frame 120 between two purlins 122. The block brace 126 may include a beam having a generally C-shaped cross sectional profile (as shown in FIG. 3B) and may include a bracket 150 on each end of the beam. In some embodiments, the bracket 150 may be coupled to a purlin 122 with at least one fastener such as a bolt and nut. However, the bracket 150 may be coupled to the purlin 122 via any suitable fastening or attachment system. Predrilled or cast openings in the purlins 122 may reduce construction time compared, e.g., to welding.

As discussed above, a vertical brace 128 of a mounting structure, e.g., the first vertical brace 128a of mounting system 100, may include a threaded rod 152. The block brace 126 may include a first surface 154, a second surface 156, and at least one opening extending through the first surface 154 and the second surface 156 (e.g., through which the rod 152 extends in FIG. 3B, similar to the way rod 152 extends through bracket 146 in FIG. 3C). In some embodiments, the at least one opening may include a hole or a slot that has been precast or drilled into the block brace 126. The vertical brace 128 may extend through the opening and may be secured with a top fastener 158 on the first surface 154 and a bottom fastener 160 on the second surface 156. The top fastener 158 and bottom fastener 160 and may include any suitable fastener and/or fastener components such as bolts and nuts, washers, rivets, retaining rings, clamps, welds, etc. Top fastener 158 on the first surface 154 and a bottom fastener 160 on the second surface 156 may ensure that there is substantial vertical support for the vehicle charger 134 and may reduce or prevent any vertical motion of the vehicle charger 134 when the vehicle charger 134 engages the vehicle 106. Further, in some embodiments, the mounting structure or mounting system 100 may be height adjustable according to the height of the vehicle 106 relative to the canopy 104 by changing the height of the threaded rod 152 from a first length to a new length (e.g., by moving the fasteners 158, 160 to a different position along the length of the rod 152) and tightening the top fastener 158 on the first surface 154 and the bottom fastener 160 on the second surface 156 at the new length. In this manner, the mounting system 100 can be configured to couple with a variety of different vehicles.

Figure 3C:
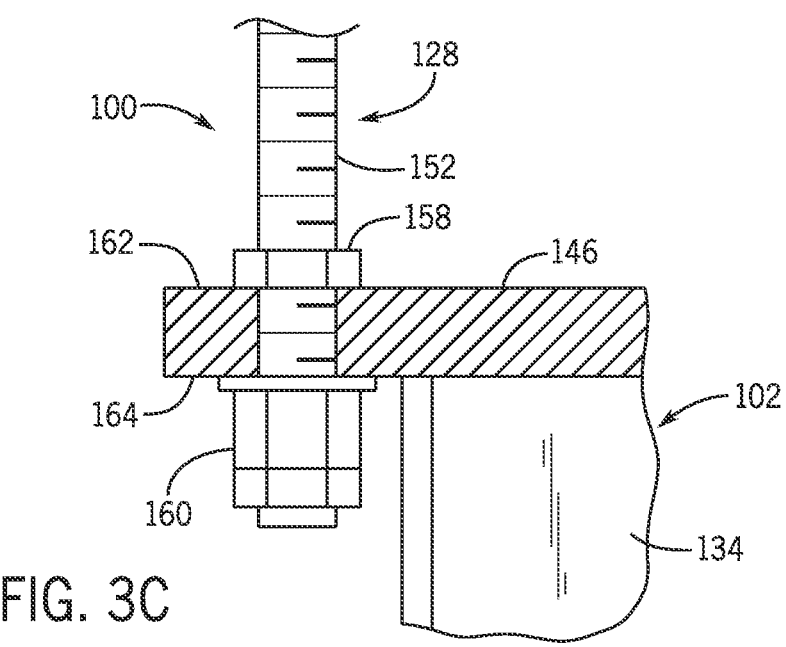
FIG. 3C is a cross-sectional schematic of a vertical brace coupled to a mounting bracket on a vehicle charger.

Referring to FIG. 3C, in some embodiments, the first mounting point 132a and the second mounting point 132b on the vehicle charger 134 may include a first surface 162, a second surface 164, and at least one opening extending through the first surface 162 and second surface 164. The opening on the mounting bracket 146 may include slot or hole located on or near a corner or edge of the mounting bracket 146. The mounting bracket 146 may be reinforced in the area of the mounting bracket 146 to provide strength and stiffness to the mounting structure. Similar to above, the vertical brace 128 may extend through the opening and may be secured with a top fastener 158 on the first surface 162 and a bottom fastener 160 on the second surface 164. The top fastener 158 and bottom fastener 160 and may include any suitable fastener and/or fastener components such as bolts and nuts, washers, rivets, retaining rings, clamps, welds, etc. As discussed above, Top fastener 158 on the first surface 162 and a bottom fastener 160 on the second surface 164 may provide vertical support for the vehicle charger 134 and reduce or prevent any relative vertical motion when the vehicle charger 134 engages the vehicle 106.

Figure 4:
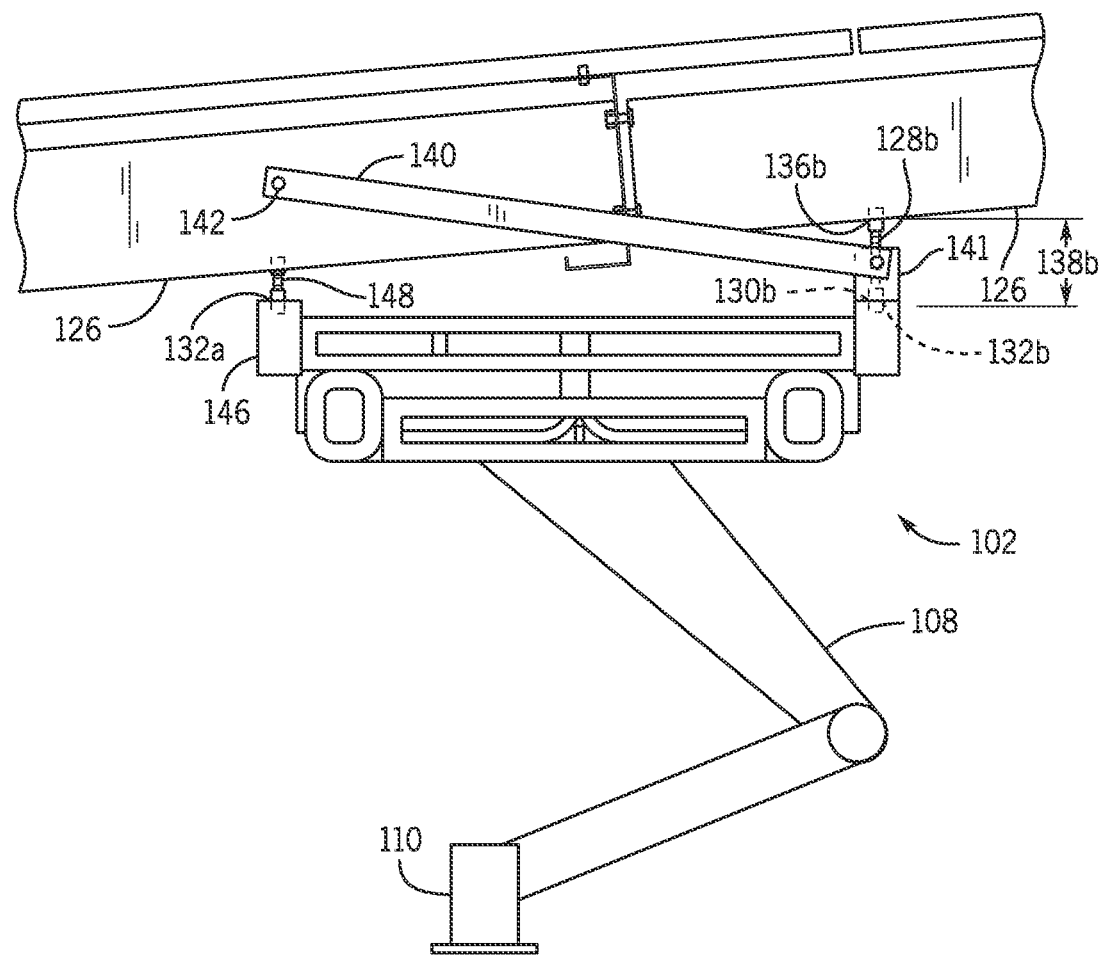
FIG. 4 is a schematic view of a mounting system for an electrical vehicle charging apparatus.

Referring now to FIG. 4, in some embodiments, the first vertical brace 128a may include a connector 148 configured to couple the first mounting point 132a on the vehicle charger 134 directly (or substantially directly) to the block brace 126. The vehicle charger 134 may be coupled directly to the block brace 126 on at least one portion of the mounting bracket 146. For example, the vehicle charger 134 may not include a portion that extends upward from the mounting bracket 146 and thus the mounting system 100 may be reinforced by securing directly to the block brace 126. In such an embodiment, the mounting system 100 may further include the second vertical brace 128b having bottom connection point 130b connectable to the second mounting point 132b on the vehicle charger 134 and top connection point 136b connectable to the block brace 126. In some embodiments, the second vertical brace 128b may have second length 138b between the bottom connection point 130b and the top connection point 136b. Second length 138b may be configured such that the connector 148 and the top connection point 136b of the second vertical brace 128b attach to the block brace 126 along a line having an about 5% to about 15% grade relative to a horizontal ground surface, as needed for efficient solar power generation. The connector 148 may include any suitable connector. In some embodiments, the connector 148 may include a nut and bolt, washers, an ATS-SBC rod-to steel beam connector, a bracket, a beam clamp, a rivet, etc. In some embodiments, the mounting bracket 146 comes into direct contact with the block brace 126, a purlin 122, or a support beam 114 without intervening connector structures.

In some embodiments, diagonal support brace 140 may be included when the first vertical brace 128a is configured to couple the first mounting point 132a directly to a block brace 126. The support bar or brace 140 may be configured to couple to the second mounting point 132b on the vehicle charger 134 (or to the mounting bracket 146) and to the additional connection point 142 on the block brace 126. Thus, the support brace 140 can resist lateral movement (e.g., left-right movement in FIG. 3A) of the mounting brackets 146. The support brace 140 may couple to the second mounting point 132b with any suitable fastener, including a bolt and nut, a threaded rod, a weld, rivets, etc. The support brace 140 may couple to the block brace 126 with a similar type of fastener, such as a bolt and nut or another suitable fastener. In some embodiments, the support brace 140 may couple to the purlin 122.

Figure 5:
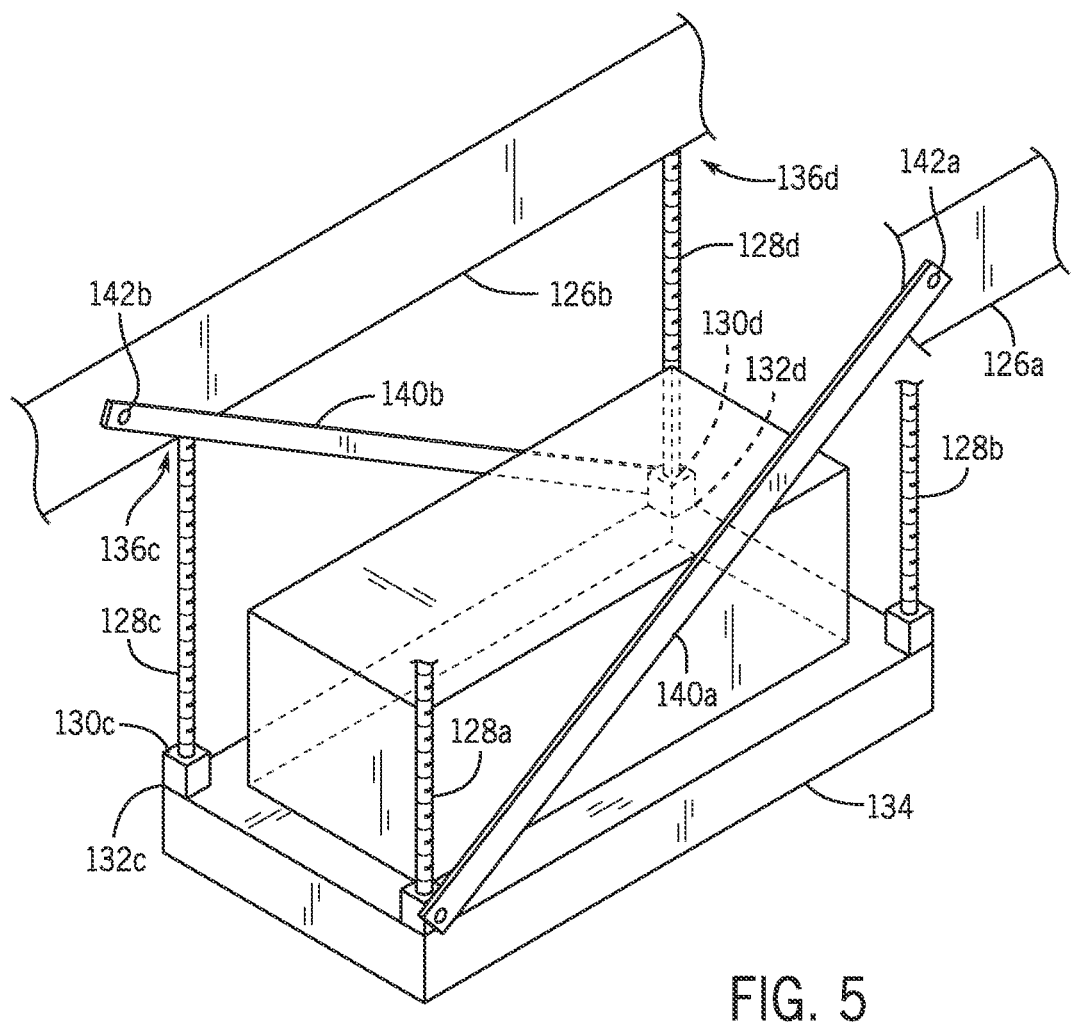
FIG. 5 is an isometric view of a mounting system for an electrical vehicle charging apparatus.

Referring now to FIG. 5, the mounting system 100 may include several connection points to couple the vehicle charger 134 to the canopy 104. In an embodiment, the block brace 126 may be a first block brace 126a. The mounting system 100 may include a second block brace 126b. This embodiment shows examples of a block brace 126b attached to multiple vertical braces 128c, 128d without a purlin 122 positioned between the braces 128c, 128d. In an embodiment, the first vertical brace 128a and the second vertical brace 128b may couple to the first block brace 126a, and the mounting system 100 may include a third vertical brace 128c and fourth vertical brace 128d coupled to the second block brace 126b. The second block brace 126b can be spaced horizontally and laterally apart from the first block brace 126a and can be connected to a purlin 122 along the length of the same purlin 122 connected to the first block brace 126a or to another nearby purlin 122. The distance between the block braces 126a, 126b can correspond to the width between mounting brackets 146 on the charging apparatus 102. Thus, the block braces 126a, 126c can be spaced apart from each other on the purlin(s) at a distance equal to the width of the charging apparatus 102. Block braces 126 showing this characteristic are illustrated in FIG. 2.

In some embodiments, the third vertical brace 128c may include a bottom connection point 130c connectable to a third mounting point 132c on the vehicle charger 134 and a top connection point 136c connectable to the second block brace 126b. The third vertical brace 128c may have a length extending between the bottom connection point 130c and the top connection point 136c substantially equal to the first vertical brace length 138a (see FIG. 3A). In other words, the third vertical brace 128c and the first vertical brace 128a may extend below the block brace 126 by an equal amount. The fourth vertical brace 128d may have a bottom connection point 130d connectable to a fourth mounting point 132d on the vehicle charger 134 and a top connection point 136d connectable to the second block brace 126b, the fourth vertical brace 128d may have a length between the bottom connection point 130d and the top connection point 136d substantially equal to the second vertical brace length 138b (see FIG. 3A). In other words, the second vertical brace and the fourth vertical brace may extend below the block brace 126 by an equal amount. In this manner, the vertical braces couple to a first end or side of the vehicle charger 134 may have a first length (e.g., braces 128a, 128c) and the vertical brasses coupled to a second end or side of the vehicle charger 134 may have a second length (e.g., braces 128b, 128d), such that the vehicle charger 134 may be parallel to a horizontal ground surface, despite the angled orientation of the block braces 126a, 126b and canopy 104.

In some embodiments, the diagonal support brace 140 may be a first diagonal support brace 140a. The first support brace 140a may couple either the first mounting point 132a or the second mounting point 132b on the vehicle charger 134 to a first additional connection point 142a on the first block brace 126a. The mounting system 100 may further include a second diagonal support brace 140b. The second support brace 140b may couple either the third mounting point 132c or the fourth mounting point 132d on the vehicle charger 134 to a second additional connection point 142b on the second block brace 126b or may couple together the first vertical brace 128a and the third vertical brace 128c. The first support brace 140a and the second support brace 140b may stiffen the mounting system 100 and better secure the vehicle charger 134 to the purlin frame 120 of the canopy 104. Both diagonal support braces 140a, 140b can help limit rotation of the charging apparatus 102 about a vertical axis or movement of the bottom connection points (e.g., 130a, 130b) in a horizontal direction relative to the top connection points (e.g., 136a, 136b).

Figure 6A:
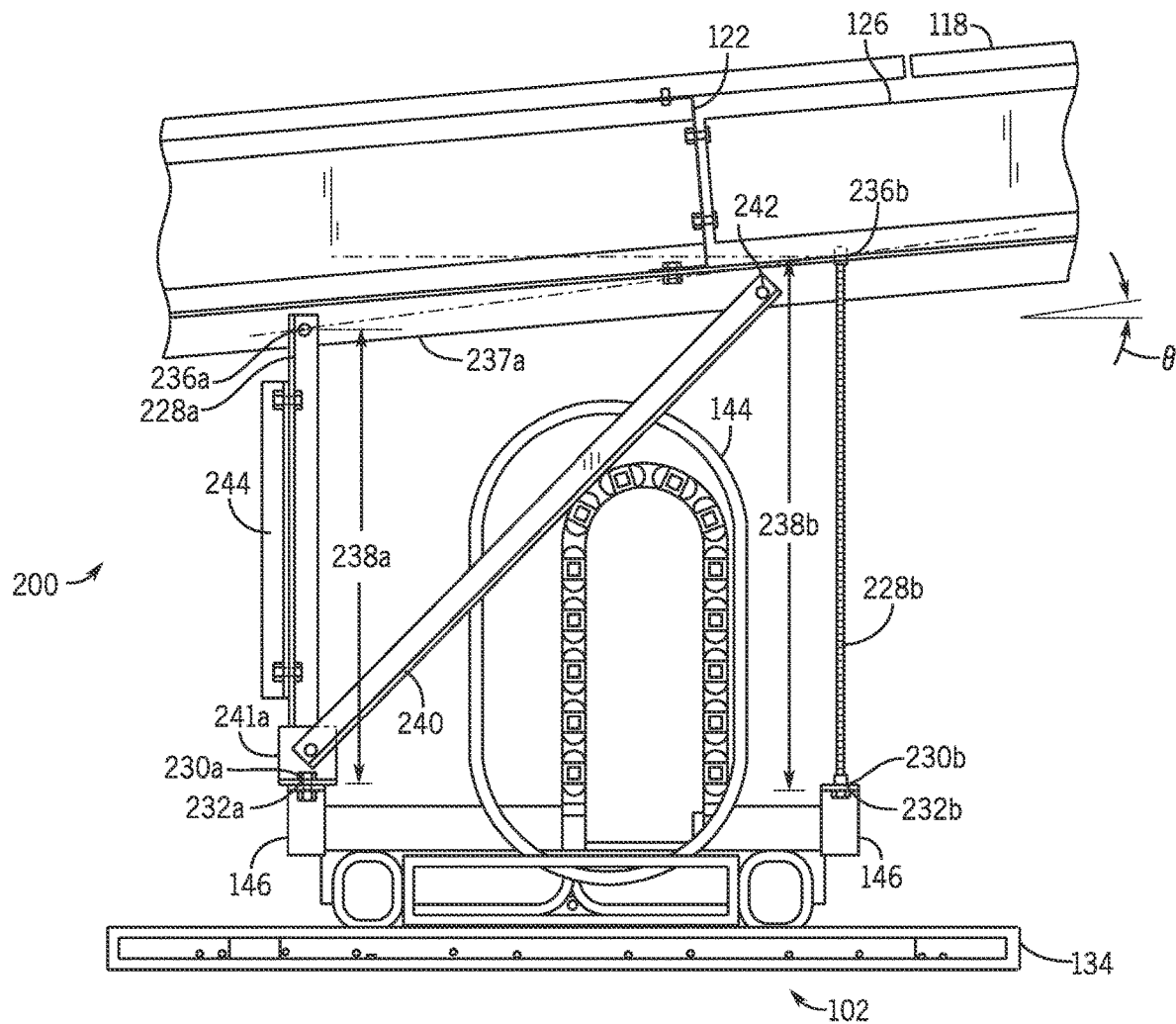
FIG. 6A is a schematic side view of a mounting system for an electrical vehicle charging apparatus.

A mounting system 200 may extend between the purlin system 120 and the electric vehicle charging apparatus 102. FIG. 6A shows an embodiment wherein a mounting system 200 or mounting structure for electric vehicle charging apparatus 102 may include a first vertical brace 228a having a bottom connection point 230a connectable to a first mounting point 232a on a vehicle charger 134 and a top connection point 236a connectable to a first upper rail 237a. The first upper rail 237a (and second upper rail 237b in FIG. 6B) can be attached to the bottom of, and can extend across, one or more purlins 122. In some embodiments, the upper rails 237 can improve the stiffness of, and can extend loads across, multiple purlins 122. Thus, in some cases, the upper rails 237 can be referred to as block braces in addition to, or instead of, the other block braces described above (i.e., 126).

In some embodiments, the first vertical brace 228a may have a first length 238a between the bottom connection point 230a and the top connection point 236a. The first vertical brace 228a may include any suitable brace material that supports at least a portion of the vehicle charger 134. In some embodiments, the first vertical brace 228a may include an angle beam (e.g., with an L-shaped cross section). The angle beam may also be constructed of steel or any other alloy, metal, plastic, composite, or other suitable material and may also include any suitable thickness to support the vehicle charger 134. The mounting system 200 may further include a second vertical brace 228b having a bottom connection point 230b connectable to a second mounting point 232b on the vehicle charger 134 and a top connection point 236b connectable to the first upper rail 237a.

In some embodiments, the first vertical brace 228a may include a connector 241a coupled to one of the mounting brackets 146 (e.g., at the first mounting point 232a). The connector 241a may couple to the first connection point 230a of the vehicle charger 134. In some embodiments, the connector 241a may be integrated into the first vertical brace 228a. The connector 241a may be coupled to the mounting bracket 146 by any suitable fasteners and attachment systems such as clamps, straps, bolts, welding, rivets, etc. The first length 238a may include the connector to the bottom connection point 230a (as shown in FIG. 6A).

In some embodiments, the second vertical brace 228b may include a threaded rod. The threaded rod may be constructed of steel or any other alloy, metal, plastic, composite, or other suitable material. The threaded rod may include any suitable diameter to support the vehicle charger 134, such as ⅜ inch, ½ inch, ¾ inch, or 1 inch. In some embodiments, the second vertical brace 228b may have a second length 238b between the bottom connection point 230b and the top connection point 236b. In some embodiments, the second vertical brace 228b may be the same type of brace as the first vertical brace 228a. In some embodiments, the second vertical brace 228b may be a different type of brace (e.g., a threaded rod). The first vertical brace 228a and the second vertical brace 228b may extend generally parallel to one another. In some embodiments, the first length 238a may be less than the second length 238b. In some embodiments, the top connection point 236a of the first vertical brace 228a and the top connection point 236b of the second vertical brace 228b may attach to the first upper rail 237a along a line having an about 5% to about 15% grade relative to the horizontal ground surface 124, which grade may correspond to an angle used to optimize solar charging efficiency of the canopy 104. FIG. 6A shows an angle θ between a horizontal plane and the slope of the first upper rail 237a. In an embodiment, θ may be from about 2.5 degrees to about 8.5 degrees, which is approximately about 5% to about 15% grade relative to the horizontal ground surface 124. The first vertical brace 228a and the second vertical brace 228b may be configured to suspend the first mounting point 232a and the second mounting point 232b from the first upper rail 237a in a horizontal plane while the top connection point 236a of the first vertical brace 228a and the top connection point 236b of the second vertical brace 228b are in a non-horizontal plane.

In some embodiments, the mounting system 200 may include at least one diagonal support bar or brace 240. The support bar or brace 240 may be configured to couple to the connector 241a which is coupled to one of the mounting brackets 146 (e.g., at either the first mounting point 232a or the second mounting point 232b) on the vehicle charger 134. The support bar or brace 240 can also couple to an additional connection point 242 on the first upper rail 237a or, alternatively, connection point 242 can be on a purlin 122, or on one of the block braces 126 positioned above the charging apparatus 102 (e.g., one of the block braces 126 on each side of a purlin 122, to a single block brace 126 extending between two purlins 122, or to a support beam 114). The connector 241a may couple to either the first mounting point 232a or the second mounting point 232b on the vehicle charger 134. In some embodiments, the support bar or brace 240 may be configured to couple to the connector 241a. In some embodiments, the support bar or brace 240 may be configured to couple to the vertical support brace 228a. The support brace may 240 may stiffen the mounting system 100 and limit rotation of the vehicle charger 134 about a vertical axis relative to the purlin frame 120 and/or the block brace 126 (e.g., due to torques applied by wind, by movement of the canopy, or by contact between the charging apparatus 102 and a vehicle).

In some embodiments, the diagonal support brace 240 may be a first diagonal support brace. The mounting system 200 may further include a second diagonal support brace 244. In some embodiments, the second support brace may 244 may further stiffen the mounting system 200 and limit rotation of the vehicle charger 134 about a vertical axis relative to the purlin frame 120 and/or the block brace 126.

Figure 6B:
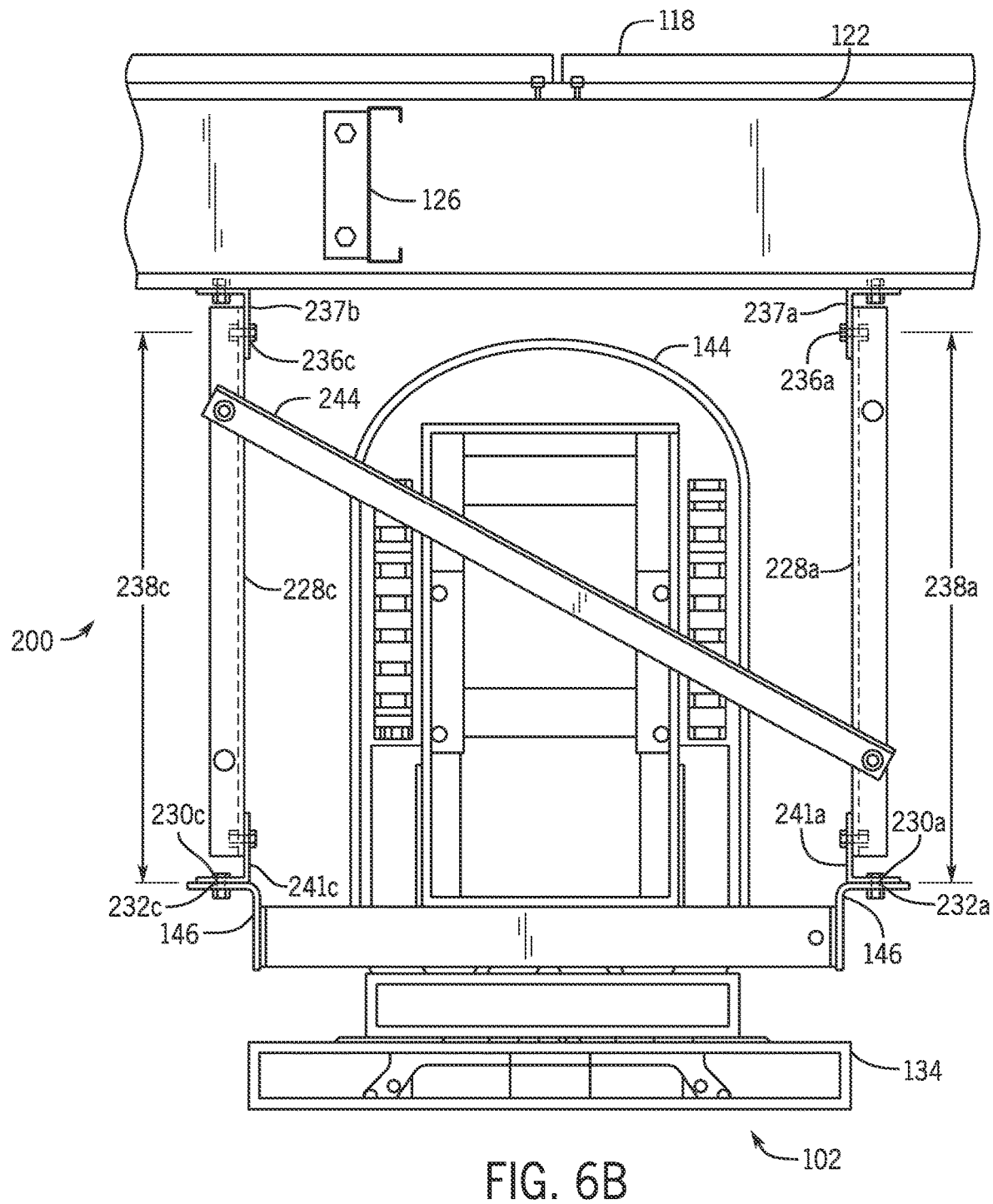
FIG. 6B is a front view of the mounting system of FIG. 6A.

FIG. 6B shows a front view of mounting system 200. Vertical brace 228c may be a third vertical brace coupled to the front end of the mounting system 200. The mounting system 200 may also include a fourth vertical brace (not shown) having a bottom connection point connectable to a fourth mounting point on the vehicle charger 134 and a top connection point connectable to the purlin 122, similar to vertical brace 228b. The third vertical brace 228c may include a bottom connection point 230c connectable to the vehicle charger 134 at a mounting point 232c and a top connection point 236c connectable to a second upper rail 237b. The first vertical brace 228a may include connector 241a and the third vertical brace 228c may include connector 241c coupled to one of the mounting brackets 146 (e.g., at the first mounting points 232a and 232c). The connectors 241a and 241c may couple to the first connection point 230a and the third connection point 230c of the vehicle charger 134. In some embodiments, the connector 241a may be integrated into the first vertical brace 228a and the connector 241c may be integrated into third vertical brace 228c. In some embodiments, the vertical brace 228c may include a third length 238c between the bottom connection point 230c and the top connection point 236c. In some embodiments, the third vertical brace 228c may be the same type of brace as the first vertical brace 228a (e.g., an L-shaped angle beam). The first vertical brace 228a and the third vertical brace 228c may extend generally parallel to one another. The first length 238a may be equal to the third length 238c such that the mounting brackets 146 of vehicle charger 134 are horizontal relative to ground surface 124. Furthermore, even if the mounting brackets 146 are vertically offset from each other (e.g., the front mounting brackets are higher than the rear mounting brackets, or vice versa), the lengths of the vertical braces can be configured to ensure that a charging connector 134 is horizontal and parallel to a ground surface while being suspended from the angled overhead structure.

The second support brace 244 may couple together the first vertical brace 228a and the third vertical brace 228c. In some embodiments, the first support brace 240 and/or the second support brace 244 may be coupled to the first upper rail 237a or the second upper rail 237b. In other embodiments, the second support brace 244 may couple together the second vertical brace 228b and the fourth vertical brace 128d.

As discussed above, in some embodiments, the vertical braces 228a and 228b may be coupled to a first upper rail 237a. Rear vertical braces (e.g., 228c and its counterpart) may be coupled to a second upper rail 237b. In other embodiments, the left-side vertical braces 228a and 228c may be coupled to a first upper rail 237a, and the right-side vertical braces (228b and its counterpart) may be coupled to a second upper rail 237b spaced apart from the first upper rail 237a, as shown in FIG. 6B. In some embodiments, the first upper rail 237a and the second upper rail 237b may be coupled to the purlin 122 and/or block brace 126. The first upper rail 237a and the second upper rail 237b may include an angle beam (e.g., an L-shaped beam). The first upper rail 237a and the second upper rail 237b may be constructed of steel or any other alloy, metal, plastic, composite, or other suitable material and may also include any suitable diameter to support the vehicle charger 134. The first upper rail 237a and the second upper rail 237b may be coupled to the block brace 126, the purlin 122, and/or the vertical braces 228a-d by any suitable fasteners and attachment systems such as clamps, straps, bolts, welding, rivets, etc. As discussed above, the third vertical brace 228c and the first vertical brace 228a may be L-shaped angle beams. In some embodiments, the angle beam portion of the first vertical brace 228a and the third vertical brace 228c may be coupled to the first upper rail 237a and the second upper rail 237b at the top connection points 236a and 236c by any suitable fasteners and attachment systems such as clamps, straps, bolts, welding, rivets, etc.

Each of the upper rails 237a, 237b can comprise angle beams (e.g., L-shaped angle beams) and can be mounted to purlins 122, block braces 126, or other overhead structures so that the upper rails 237a, 237b have a vertically-oriented portion and a horizontally-oriented portion, as indicated by the inverted L-shape in FIG. 6B. The angle beam portion of the first vertical brace 228a and the third vertical brace 228c may be coupled to a vertically-oriented portion of the first upper rail 237a and the second upper rail 237b and to the vertical portion of the connectors 241a and 241c, as shown in FIG. 6B. In other embodiments, the first vertical brace 228a and the third vertical brace 228c may be coupled to the horizontally-oriented portions of the first upper rail 237a and the second upper rail 237b. In some embodiments, the angle beam portion of the first vertical brace 228a and the third vertical brace 228c may be coupled to the horizontal portion of the connectors 241a and 241c. Additionally, the rear vertical braces (e.g., 228b) can be mounted to the horizontally-oriented portion of the upper rails (e.g., 237a, as shown in FIG. 6A). Thus, at least one of the vertical braces (e.g., 228a) can attach to a lateral-side-facing surface of the upper rail (e.g., 237a), and at least one of the vertical braces (e.g., 228b) can attach to a vertically-facing surface of the upper rail (e.g., 237a).

While various aspects and embodiments have been disclosed herein, other aspects and embodiments are contemplated. The various aspects and embodiments disclosed herein are for purposes of illustration and are not intended to be limiting. Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. A mounting system for an electric vehicle charging apparatus, comprising:
    a first vertical brace having a bottom connection point connectable to a first mounting point on a vehicle charger and a top connection point connectable to a sloped support structure, the first vertical brace having a first length between the bottom and top connection points; and
    a second vertical brace having a bottom connection point connectable to a second mounting point on the vehicle charger and a top connection point connectable to the sloped support structure, the second vertical brace having a second length between the top and bottom connection points, wherein the first length is less than the second length.

2. The mounting system of claim 1, wherein:
    the sloped support structure comprises a first block brace and the mounting system includes a second block brace, wherein the first and second vertical braces couple to the first block brace and the mounting system includes a third vertical brace and a fourth vertical brace, the third and fourth vertical braces being coupled to the second block brace;
    the third vertical brace includes a bottom connection point connectable to a third mounting point on the vehicle charger and a top connection point connectable to the second block brace, the third vertical brace having a length between the bottom and top connection points equal to the first vertical brace; and
    the fourth vertical brace includes a bottom connection point connectable to a fourth mounting point on the vehicle charger and a top connection point connectable to the second block brace, the fourth vertical brace having a length between the top and bottom connection points equal to the second vertical brace.

3. The mounting system of claim 1, wherein the sloped support structure includes a block brace configured to couple to a purlin frame to fortify the purlin frame and limit rotation of the vehicle charger relative to the purlin frame.

4. The mounting system of claim 1, further comprising at least one diagonal support brace, wherein the support brace couples a connector coupled to either the first or second mounting point on the vehicle charger to an additional connection point on the sloped support structure.

5. The mounting system of claim 1, wherein the first vertical brace includes a connector configured to couple the first mounting point on the vehicle charger directly to the sloped support structure.

6. The mounting system of claim 1, wherein the top connection point of the first vertical brace and the top connection point of the second vertical brace attach to the sloped support structure along a line having an about 5% to about 15% grade relative to a horizontal ground surface.

7. The mounting system of claim 1, wherein the sloped support structure includes a beam having a generally C-shaped cross-sectional profile and a bracket on each end of the beam.

8. The mounting system of claim 1, wherein the first vertical brace or the second vertical brace includes a threaded rod.

9. The mounting system of claim 1, further comprising the vehicle charger, wherein the first and second mounting points on the vehicle charger include a first surface, a second surface, and at least one opening extending through the first and second surfaces, wherein the first vertical brace or the second vertical brace extends through the opening and is secured with a top fastener on the first surface and a bottom fastener on the second surface.

10. The mounting system of claim 1, further comprising the sloped support structure, the sloped support structure having a block brace, wherein the block brace includes a first surface, a second surface, and at least one opening extending through the first and second surfaces, wherein the vertical brace extends through the opening and is secured with a top fastener on the first surface and a bottom fastener on the second surface.

11. A system for charging an electric vehicle, comprising:
    a canopy having a purlin frame and supporting a photovoltaic module for generating electricity above an electric vehicle;
    a mounting structure coupled to the purlin frame, the mounting structure including a first vertical brace and a second vertical brace; and
    at least one electric vehicle charging apparatus including a mounting bracket coupled to the mounting structure, wherein the electric vehicle charging apparatus is configured to connect to an electric vehicle from above the electric vehicle;
    wherein the first vertical brace has a first length coupling the purlin frame to the mounting bracket and the second vertical brace having a second length coupling the purlin frame to the mounting bracket, wherein the first length is less than the second length.

12. The system of claim 11, wherein the canopy includes a support structure comprising a vertical support column coupled to a laterally-extending support beam and a bottom portion coupled to a ground foundation.

13. The system of claim 11, wherein the canopy has a generally T-shaped side profile.

14. The system of claim 11, wherein a first end of the first vertical brace and a first end of the second vertical brace attach to a block brace along a line having an about 5% to about 15% grade relative to a horizontal ground surface, wherein the block brace is coupled to the purlin frame.

15. The system of claim 11, wherein the at least one electric vehicle charging apparatus extends upward from the mounting bracket without contacting the canopy.

16. The system of claim 11, wherein the at least one electric vehicle charging apparatus includes an arm movable between a lowered position to engage an electric vehicle and a raised position disengaged from the electric vehicle.

17. The system of claim 16, wherein the at least one electric vehicle charging apparatus includes a charging connector coupled to the arm, wherein the at least one electric vehicle charging apparatus is mounted to the canopy with the charging connector oriented generally parallel to a horizontal ground surface.

18. An electric vehicle charger mounting structure, comprising:
- a purlin brace system configured to attach to a canopy structure;
- a first vertical brace connectable to a first attachment point on the purlin brace system and to a first mounting point on a vehicle charger;
- a second vertical brace connectable to a second attachment point on the purlin brace system and to a second mounting point on the vehicle charger;
- wherein the first and second vertical braces are configured to suspend the first and second mounting points from the purlin brace system in a horizontal plane and wherein the first and second attachment points are in a non-horizontal plane; and
- wherein the purlin brace system may include at least one purlin brace.

19. The mounting structure of claim 18, further comprising at least one support bar extending diagonally between a connector coupled to either the first or second mounting point and a third attachment point on the purlin brace.

20. The mounting structure of claim 18, wherein the purlin brace system is configured to fortify the canopy structure and limit rotation of the vehicle charger relative to the canopy structure.

\* \* \* \* \*